(12) United States Patent
Jung et al.

(10) Patent No.: US 12,489,934 B2
(45) Date of Patent: Dec. 2, 2025

(54) SIGNAL PROCESSING DEVICE AND IMAGE DISPLAY DEVICE COMPRISING SAME

(71) Applicant: LG ELECTRONICS INC., Seoul (KR)

(72) Inventors: Jaeyoun Jung, Seoul (KR); Jihoon Lee, Seoul (KR); Jaeseop So, Seoul (KR); Jeongil Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 609 days.

(21) Appl. No.: 17/909,126

(22) PCT Filed: Mar. 2, 2020

(86) PCT No.: PCT/KR2020/002968
§ 371 (c)(1),
(2) Date: Sep. 2, 2022

(87) PCT Pub. No.: WO2021/177478
PCT Pub. Date: Sep. 10, 2021

(65) Prior Publication Data
US 2023/0164370 A1 May 25, 2023

(51) Int. Cl.
*H04N 21/23* (2011.01)
*H04N 21/2343* (2011.01)
(Continued)

(52) U.S. Cl.
CPC ....... *H04N 21/2343* (2013.01); *H04N 21/433* (2013.01)

(58) Field of Classification Search
CPC .......... H04N 21/2343; H04N 21/433
(Continued)

(56) References Cited

U.S. PATENT DOCUMENTS

| 8,750,389 B2 | 6/2014 | Legrand | |
|---|---|---|---|
| 2015/0288977 A1* | 10/2015 | Chan | G06F 13/1673 348/487 |

(Continued)

FOREIGN PATENT DOCUMENTS

| KR | 100782776 | 12/2007 |
|---|---|---|
| KR | 100807100 | 3/2008 |

(Continued)

OTHER PUBLICATIONS

PCT International Application No. PCT/KR2020/002968, Search Report dated Nov. 20, 2020, 3 pages.

*Primary Examiner* — Jeffery A Williams
(74) *Attorney, Agent, or Firm* — LEE, HONG, DEGERMAN, KANG & WAIMEY

(57) ABSTRACT

An image display apparatus including the same are disclosed. A signal processing device of the present disclosure includes a decoder to decode data encoded based on at least two different coder-decoders, a buffer memory, and a controller to control the decoder and the buffer memory, wherein the controller controls the decoder to divide the buffer memory into a first storage space and a second storage space based on a codec change signal being received, and manages input or output of data of the first and the second storage space in parallel or simultaneously. Accordingly, it is possible to change codecs in real time without delay when codec change is required and to provide content without interruption of a screen to a user.

17 Claims, 15 Drawing Sheets

(51) Int. Cl.
  *H04N 21/43* (2011.01)
  *H04N 21/433* (2011.01)
(58) Field of Classification Search
  USPC ........................................... 375/240.1
  See application file for complete search history.

(56) References Cited

U.S. PATENT DOCUMENTS

2016/0188279 A1* 6/2016 Rajamani ............... G09G 5/026
                                                    345/2.3
2020/0244584 A1* 7/2020 Srinivasan ............. H04L 65/80

FOREIGN PATENT DOCUMENTS

| KR | 101484101 | 1/2015 |
| KR | 1020190043825 | 4/2019 |

* cited by examiner

SIGNAL PROCESSING DEVICE AND IMAGE DISPLAY DEVICE COMPRISING SAME

CROSS-REFERENCE TO RELATED APPLICATIONS

This application is the National Stage filing under 35 U.S.C. 371 of International Application No. PCT/KR2020/002968, filed on Mar. 2, 2020, the contents of which are all incorporated by reference herein in their entirety.

BACKGROUND

1. Field of the Disclosure

The present disclosure relates to a signal processing device and an image display apparatus including the same, and more specifically, to a signal processing device capable of dynamically changing codecs when a plurality of pieces of content using different coder-decoders (codecs) are received, and an image display apparatus including the same.

2. Description of the Related Art

Digital broadcasting services are rapidly expanding. A transmitting side that provides digital broadcasting services compresses and multiplexes video, audio, and other additional service information according to MPEG-TS standard and transmits the information in the form of a transport stream packet, and a receiving side parses the transport stream to extract additional service information and the like, decodes the extracted information and uses the decoded information.

In the same channel of current broadcasting, video and audio are encoded using a single codec and transmitted. In this case, an image display device that reproduces broadcast content may be able to reproduce only content using a single codec. However, content to which different coder-decoders (codecs) are applied may be applied even in the same channel depending on broadcasting, and there are cases in which streaming content is formed by combining a plurality of pieces of content using different coder-decoders (codecs).

Therefore, when a plurality of pieces of content using different coder-decoders (codecs) is received, there is a need for a method for minimizing codec switching delay by allowing dynamic codec change and providing content to a user without interruption of the screens.

However, when a conventional image display apparatus receives content to which different coder-decoders (codecs) are applied through one channel, the content may not be reproduced because codec change is not performed. Further, as in the case of channel switching, a resource reallocation process such as buffer emptying and initialization due to codec change may occur. In this case, the image display apparatus has a problem that interruption of the screen may occur according to codec change.

Moreover, when streaming content generated by combining a plurality of pieces of content to which different coder-decoders (codecs) are applied is reproduced, interruption of images of the streaming content may occur at the time of codec change.

SUMMARY

Therefore, the present disclosure has been made in view of the above problems, and it is an object of the present disclosure to provide a signal processing device capable of allowing dynamic codec change when a plurality of pieces of content using different coder-decoders (codecs) is received, and an image display apparatus including the same.

It is another object of the present disclosure to provide a signal processing device that minimizes codec switching delay when a plurality of pieces of content using different coder-decoders (codecs) is received, and an image display apparatus including the same.

The objects of the present disclosure are not limited to the objects mentioned above, and other objects which are not mentioned will be clearly understood by those of ordinary skill in the art to which the present disclosure belongs from the description below.

In accordance with the present disclosure, the above and other objects can be accomplished by the provision of a signal processing device including a decoder configured to decode data encoded based on at least two different coder-decoders (codecs), a buffer memory configured to store the encoded data and data decoded by the decoder, and a controller configured to control the decoder and the buffer memory, wherein the controller controls the decoder to divide the buffer memory into a first storage space related to first data and a second storage space related to second data using a codec different from a codec used for the first data based on a codec change signal being received, and manages input or output of data of the first storage space and the second storage space in parallel or simultaneously.

In accordance with another aspect of the present disclosure, the above and other objects can be accomplished by providing an image display apparatus including a display and the above-described signal processing device.

Effects of the Disclosure

The present disclosure has the following advantages.

A signal processing device according to an embodiment of the present disclosure includes a decoder configured to decode data encoded based on at least two different coder-decoders (codecs), a buffer memory configured to store the encoded data and data decoded by the decoder, and a controller configured to control the decoder and the buffer memory, wherein the controller may control the decoder to divide the buffer memory into a first storage space related to first data and a second storage space related to second data using a codec different from a codec used for the first data based on a codec change signal being received, and manage input or output of data of the first storage space and the second storage space in parallel or simultaneously. Accordingly, when a plurality of pieces of content using different coder-decoders (codecs) is received, codec switching delay can be minimized.

In the signal processing device according to an embodiment of the present disclosure, the controller may compare a size of an available storage space of the buffer memory with a preset size, and based on the size of the available storage space being equal to or greater than the preset size, control the decoder to allocate the available storage space as the second storage space. Accordingly, when a plurality of pieces of content using different coder-decoders (codecs) is received, codec switching delay can be minimized.

In the signal processing device according to an embodiment of the present disclosure, the controller may compare the size of the available storage space with the preset size after the decoder decodes the first data stored in the buffer memory and sequentially outputs all of the decoded first data to the buffer memory. Accordingly, when a plurality of pieces of content using different coder-decoders (codecs) is received, codec switching delay can be minimized.

In the signal processing device according to an embodiment of the present disclosure, in case in which the decoder allocates the available storage space as the second storage space, the controller may control the decoder to sequentially receive the second data, store the received second data in the buffer memory, decode the stored second data, and sequentially output the second data to the buffer memory. Accordingly, when a plurality of pieces of content using different coder-decoders (codecs) is received, codec switching delay can be minimized.

The signal processing device according to an embodiment of the present disclosure may further include a renderer configured to render the decoded first data or the decoded second data stored in the buffer memory and to output the rendered data. Accordingly, when a plurality of pieces of content using different coder-decoders (codecs) is received, codec switching delay can be minimized.

In the signal processing device according to an embodiment of the present disclosure, the controller may transmit the decoded second data stored in the buffer memory to the renderer to output data rendered in response to a refresh rate. Accordingly, when a plurality of pieces of content using different coder-decoders (codecs) is received, codec switching delay can be minimized.

In the signal processing device according to an embodiment of the present disclosure, the first data and the second data may comprise at least one piece of frame data, and whenever the renderer completes rendering of some frame data of the decoded first data, the controller may control the decoder to additionally allocate a storage space of the buffer memory in which the frame data has been stored as the second storage space. Accordingly, when a plurality of pieces of content using different coder-decoders (codecs) is received, codec switching delay can be minimized.

In the signal processing device according to an embodiment of the present disclosure, the buffer memory may include a first buffer memory for storing the encoded data and a second buffer memory for storing the decoded data, and the controller may control the decoder to change sizes of the first buffer memory and the second buffer memory based on a type of a codec used for encoding of the encoded data. Accordingly, when a plurality of pieces of content using different coder-decoders (codecs) is received, codec switching delay can be minimized.

In the signal processing device according to an embodiment of the present disclosure, the buffer memory may include a first buffer memory for storing the encoded data and a second buffer memory for storing the decoded data, and the controller may control the decoder to set the sizes of the first buffer memory and the second buffer memory to a maximum value among buffer sizes required by different coder-decoders (codecs). Accordingly, when a plurality of pieces of content using different coder-decoders (codecs) is received, codec switching delay can be minimized.

The signal processing device according to an embodiment of the present disclosure may further include a demultiplexer configured to receive data and to separate the encoded data from the received data, wherein the encoded data may include at least one of encoded video data, encoded audio data, or encoded subtitle data. Accordingly, when a plurality of pieces of content using different coder-decoders (codecs) is received, codec switching delay can be minimized.

In the signal processing device according to an embodiment of the present disclosure, the demultiplexer may analyze a header of the received data, determine a type of a codec used for encoding of the encoded data, and generate and output the codec change signal. Accordingly, when a plurality of pieces of content using different coder-decoders (codecs) is received, codec switching delay can be minimized.

In the signal processing device according to an embodiment of the present disclosure, a decoding rate of the decoder may be higher than a rendering rate of the renderer. Accordingly, when a plurality of pieces of content using different coder-decoders (codecs) is received, codec switching delay can be minimized.

The effects of the present disclosure are not limited to the effects mentioned above, and other effects which are not mentioned will be clearly understood by those of ordinary skill in the art to which the present disclosure belongs from the description below.

DETAILED DESCRIPTION OF THE PREFERRED EMBODIMENTS

Figure 1:
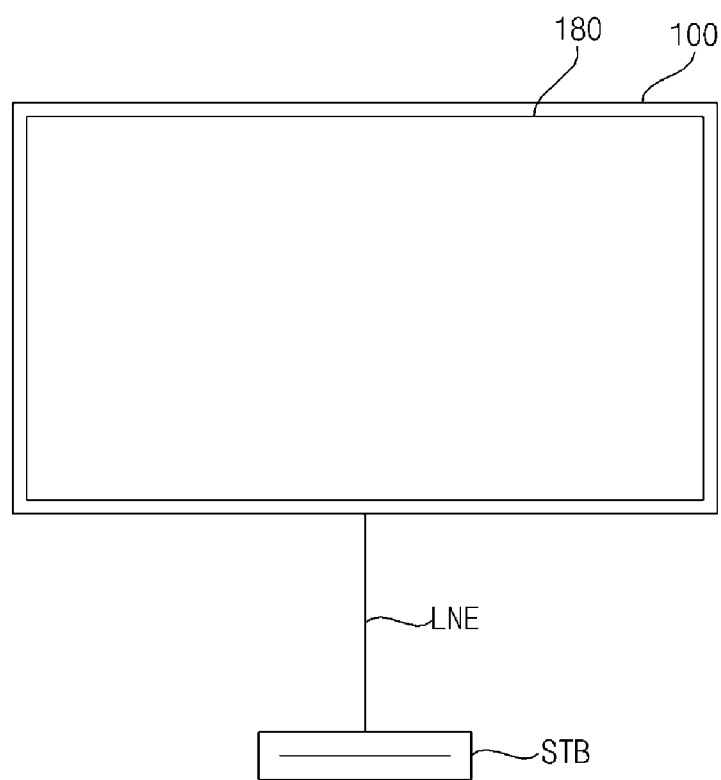
FIG. 1 is a diagram showing an image display apparatus according to an embodiment of the present disclosure.

Hereinafter, the present disclosure will be described in detail with reference to the accompanying drawings.

Regardless of reference numerals, the same or similar components are assigned the same reference numerals, and redundant descriptions thereof will be omitted. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

In the following description, if a detailed description of known techniques associated with the present disclosure would unnecessarily obscure the gist of the present disclosure, detailed description thereof will be omitted. In addition, the accompanying drawings are only for easy understanding of the embodiments disclosed in the present description, and the technical spirit disclosed in the present description is not limited by the accompanying drawings, and the drawings include all changes, equivalents and substitutes included in the spirit and scope of the present disclosure.

While terms, such as "first" and "second", may be used to describe various components, such components are not limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

An element described in the singular form is intended to include a plurality of elements unless the context clearly indicates otherwise.

In the present application, it will be further understood that the terms "comprise" or "include" specifies the presence of stated features, integers, steps, operations, elements, components, and/or combinations thereof, but do not preclude the presence or addition of one or more other features, integers, steps, operations, elements, components, and/or combinations.

FIG. 1 is a diagram showing an image display apparatus according to an embodiment of the present disclosure.

Referring to the figure, an image display apparatus 100 may include a display 180.

The display 180 may be implemented with any one of various panels. For example, the display 180 may be any one of a liquid crystal display panel (LCD panel), an organic light emitting diode panel (OLED panel), an inorganic light emitting diode panel (LED panel).

Meanwhile, the image display apparatus 100 may receive an external input signal through an external electronic device or a set-top box (STB) and a cable (LNE).

The image display apparatus 100 according to an embodiment of the present disclosure includes a decoder for decoding data encoded based on at least two different coder-decoders (codecs), a buffer memory for storing encoded data and data decoded by a decoder, and a controller for controlling operations of the decoder and the buffer memory, wherein the controller controls the decoder to divide the buffer memory into a first storage space related to first data and a second storage space related to second data using a codec different from that used for the first data based on a codec change signal being received, and manages input or output of data of the first storage space and the second storage space in parallel or simultaneously. Accordingly, when a plurality of pieces of content using different coder-decoders (codecs) is received, it is possible to minimize codec switching delay.

Meanwhile, the image display apparatus 100 in FIG. 1 may be a monitor, a TV, a tablet PC, a mobile terminal, etc.

Figure 2:
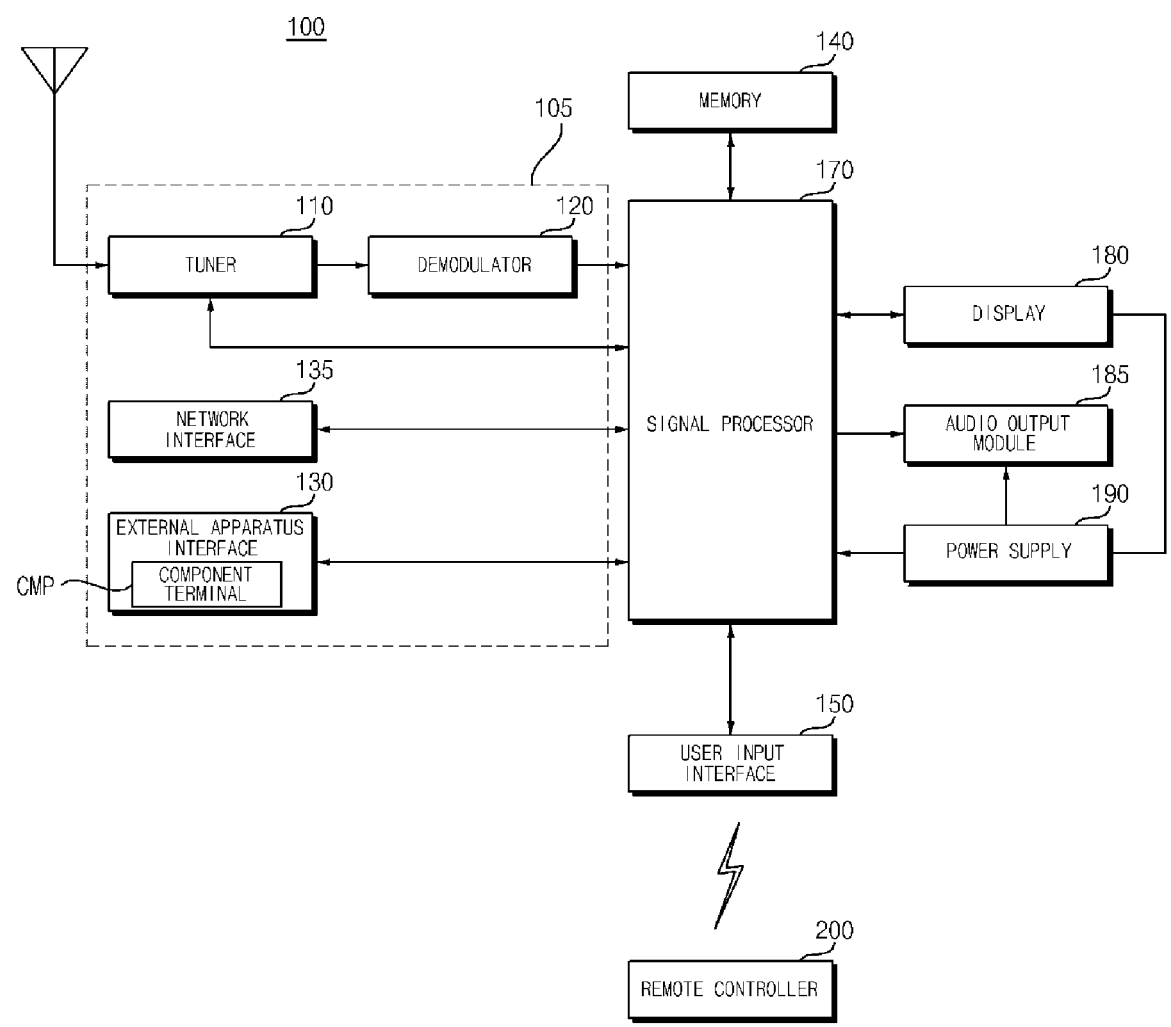
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processor 170, a display 180, and an audio output module 185.

The image receiver 105 may include a tuner 110, a demodulator 120, a network interface 135, and an external apparatus interface 130.

Meanwhile, unlike the drawing, the image receiver 105 may include only the tuner 110, the demodulator 120, and the external apparatus interface 130. That is, the network interface 135 may not be included.

The tuner 110 selects an RF broadcast signal corresponding to a channel selected by a user or all prestored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 can process a digital broadcast signal or an analog broadcast signal. The analog baseband image or audio signal (CVBS/SIF) output from the tuner 110 may be directly input to the signal processor 170.

Meanwhile, the tuner 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output module 185.

The external apparatus interface 130 may transmit or receive data with a connected external apparatus (not shown), e.g., a settop box 50. To this end, the external apparatus interface 130 may include an A/V input and output module (not shown).

The external apparatus interface 130 may be connected in wired or wirelessly to an external apparatus such as a digital versatile disk (DVD), a Blu ray, a game equipment, a camera, a camcorder, a computer (note book), and a settop box, and may perform an input or output operation with an external apparatus.

For example, the external apparatus interface 130 may receive an external input signal through a component terminal CMP or the like. In this case, the external input signal may include a mixed synchronization signal and image signal.

The A/V input and output module may receive image and audio signals from an external apparatus. Meanwhile, a wireless communicator (not shown) may perform short range wireless communication with other electronic apparatus.

Through the wireless communicator (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network.

Meanwhile, the network interface 135 may include a wireless communicator (not shown).

The memory 140 may store a program for each signal processing and control in the signal processor 170, and may store signal processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor device (not shown) that senses a user's gesture to the signal processor 170, or may transmit a signal from the signal processor 170 to the sensor device (not shown).

The signal processor 170 may demultiplex the input stream through the tuner 110, the demodulator 120, the network interface 135, or the external apparatus interface 130, or process the demultiplexed signals to generate and output a signal for image or audio output.

For example, the signal processor 170 receives a broadcast signal received by the image receiver 105 or an HDMI signal, and perform signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output module 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like.

That is, the signal processor 170 may perform a variety of signal processing and thus it may be implemented in the form of a system on chip (SOC). This will be described later with reference to FIG. 3.

In addition, the signal processor 170 can control the overall operation of the image display apparatus 100. For example, the signal processor 170 may control the tuner 110 to control the tuning of the RF broadcast corresponding to the channel selected by the user or the previously stored channel.

In addition, the signal processor 170 may control the image display apparatus 100 according to a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, or a text.

Meanwhile, the signal processor 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output module 185 receives a signal processed by the signal processor 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processor 170.

The signal processor 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output module 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
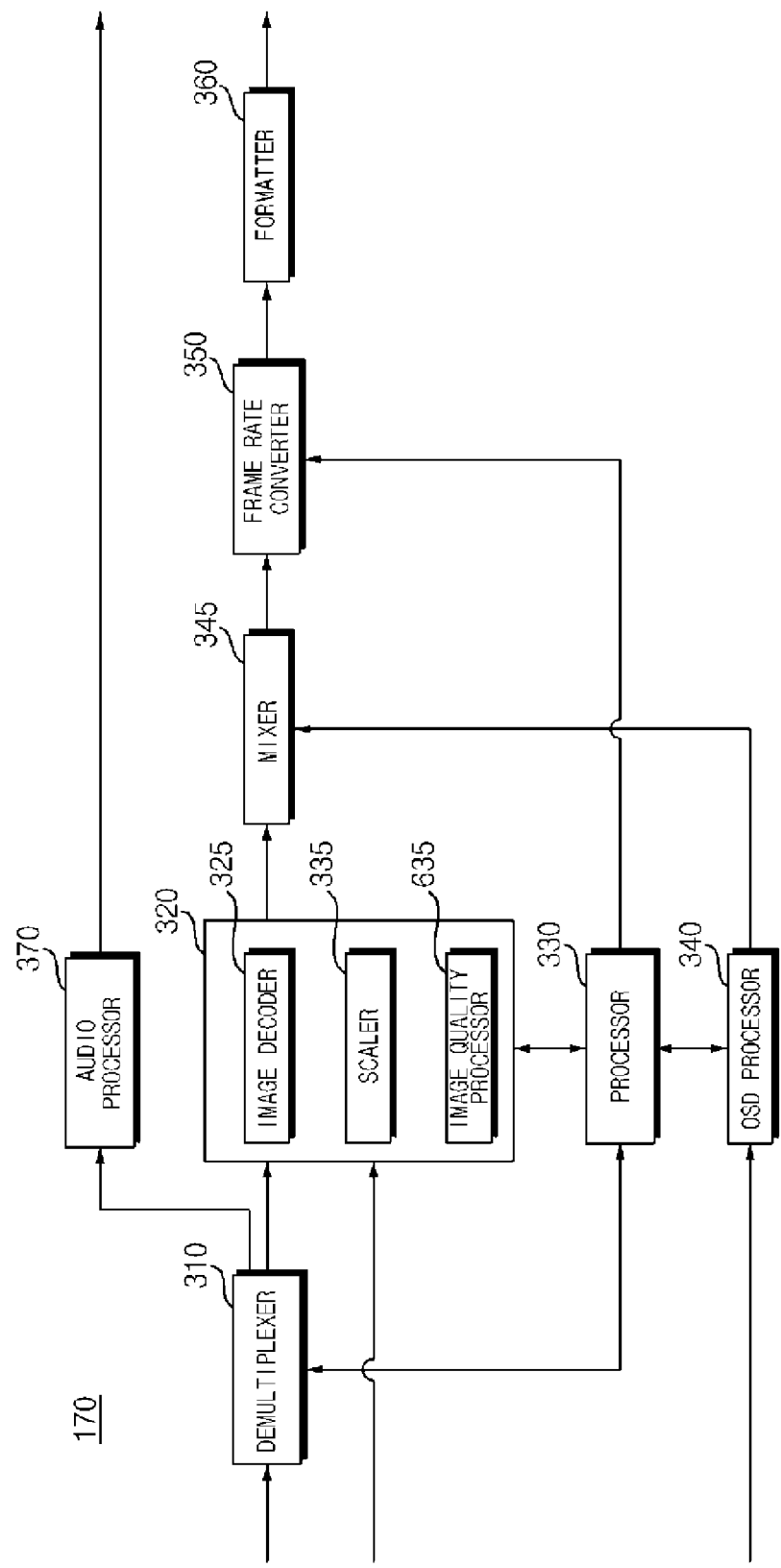
FIG. 3 is an example of an internal block diagram of the signal processor in FIG. 2.

FIG. 3 is an example of an internal block diagram of the signal processor in FIG. 2.

Referring to the figure, the signal processor 170 according to an embodiment of the present disclosure may include a demultiplexer 310, an image processor 320, a processor 330, and an audio processor 370. In addition, the signal processor 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform signal processing based on high dynamic range (HDR), change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various pieces of information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

A frame rate converter (FRC) 350 may convert a frame rate of an input image. The FRC 350 may output the input image without changes.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processor 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the image processor 320.

Figure 4:
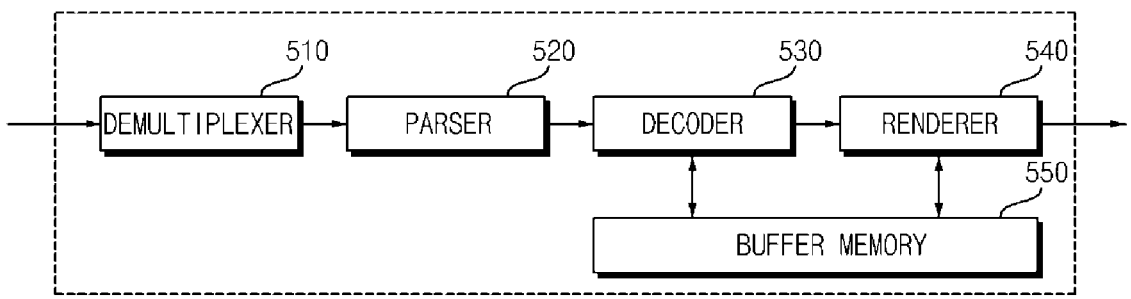
FIG. 4 is an example of an internal block diagram of a general signal processing device.

FIG. 4 is an example of an internal block diagram of a general signal processing device.

The general signal processing device 500 performs various types of signal processing on input source data to generate video or audio in a form that a user can view and hear.

Source data input to the signal processing device 500 is data obtained by encoding a video or audio source by a source device (not shown) and transmitted. The input source data may be received broadcast data or various types of streaming content data received through the Internet or the like.

An encoder (not shown) of the source device encodes a video or audio source. For example, the encoder may perform encoding based on a codec standard such as H.264, MPEG-4, or HEVC. Here, the encoder may store encoded video or audio data in a memory. In addition, the encoder may transmit the encoded video or audio data to another electronic device such as the signal processing device 500 in the form of streaming or a file.

The signal processing device 500 includes a demultiplexer 510, a parser 520, a decoder 530, a renderer 540, and a buffer memory 550, and the demultiplexer 510, the parser 520, the decoder 530, and the renderer 540 may be configured in the form of s a pipeline in which the modules thereof are connected.

The demultiplexer 510 separates data input to the pipeline into video data, audio data, and the like.

The parser 520 reprocesses the data separated by the demultiplexer 510 into a form that can be processed by the decoder 530. The parser 520 may group or separate the data into units (NAL, AU, or the like) that can be processed by the decoder 530.

The decoder 530 decodes the data reprocessed by the parser 520. The decoder 530 may include a video decoder or an audio decoder.

The renderer 540 renders the video data decoded by the decoder 530 to generate an image or video that can be displayed on an image display apparatus such as a display, or renders the decoded audio data to generate a sound that can be output through a source output device such as a speaker.

The buffer memory 550 temporarily stores encoded data before being decoded by the decoder 530 or temporarily stores data decoded by the decoder 530.

If the general signal processing device 500 receives data using a different codec while receiving data using a specific codec and processing the data, the codec cannot be changed and thus signal processing cannot be performed on the data. Accordingly, content using a different codec cannot be reproduced.

Even when signal processing can be performed on data using a different codec, the signal processing device 500 needs to completely empty the buffer memory 550 for data being previously processed and initializes each module of the pipeline including the decoder 530 and the renderer 540. In this case, it is impossible for the renderer 540 to continuously process frame data between content previously reproduced and content to be reproduced which uses a different codec.

When the operation of the renderer 540 stops once, it generally takes several hundred milliseconds until an image or sound rendered by the renderer 540 is output again.

Figure 5:
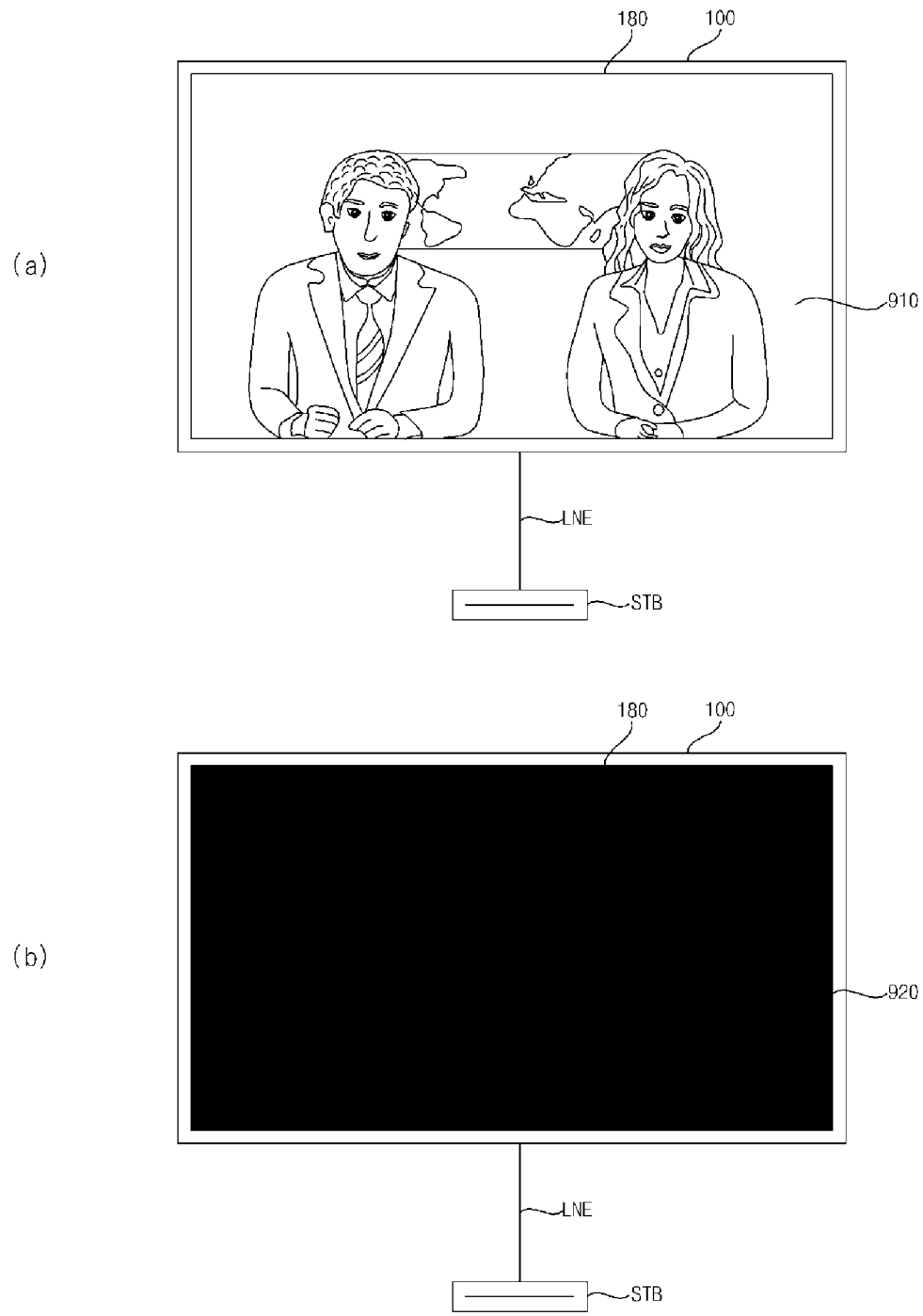
FIG. 5 is a diagram illustrating image display on the image display apparatus.

FIG. 5 is a diagram illustrating image display on an image display apparatus based on data received from a general signal processing device.

Referring to the figure, the image display apparatus 100 may display an image 910 corresponding to an image signal on the display 180 using data processed by the signal processing device through processing such as decoding and rendering.

If a plurality of pieces of content using different coder-decoders (codecs) is received, the signal processing device cannot handle a changed codec, or empties the buffer memory and initializes the modules.

In this case, the image display apparatus 100 cannot display the image 910 using the changed codec on the display 180 or needs to wait until the signal processing device generates an image using the changed codec.

Accordingly, the image may not be continuously displayed on the display 180 or a black screen 920 may be temporarily displayed on the display 180. Accordingly, a user who is looking at the display 180 cannot view the image, or even if the user views the image, he/she may feel a momentary flickering of the screen.

Therefore, the image display apparatus needs to normally reproduce a changed image and it is desirable to prevent such screen flickering.

To this end, it is desirable to allow the signal processing device to dynamically change codecs when a plurality of pieces of contents using different coder-decoders (codecs) is received to minimize codec switching delay.

This will be described below with reference to FIG. 6.

Figure 6:
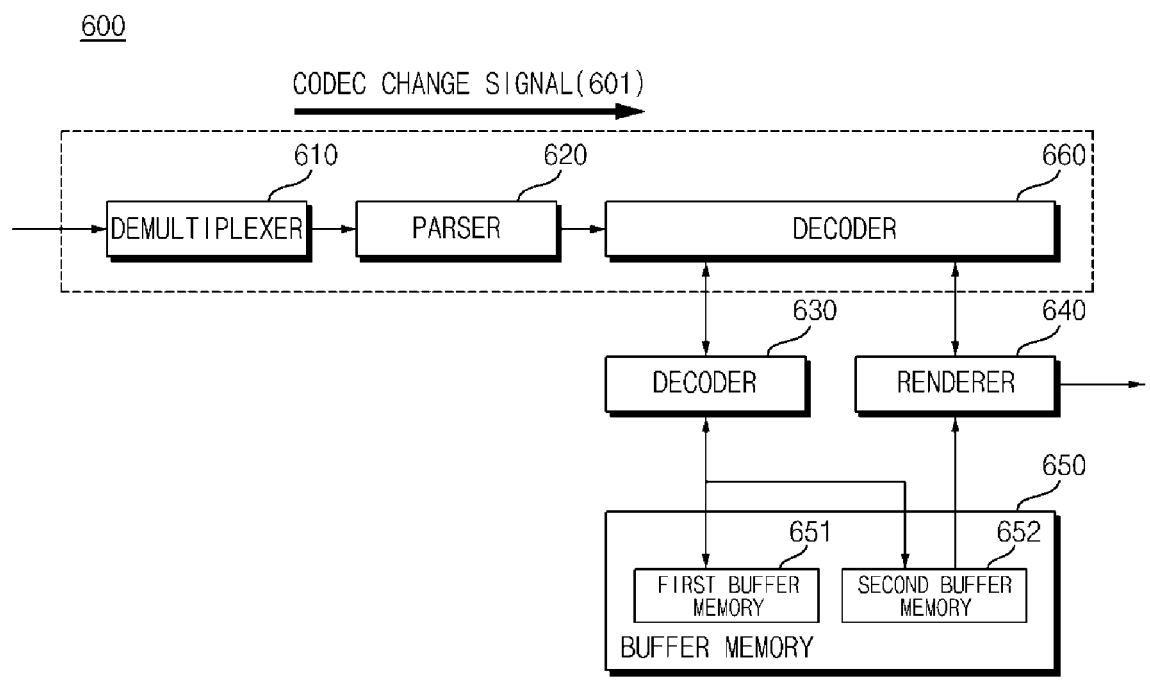
FIG. 6 is an example of an internal block diagram of a signal processing device according to an embodiment of the present disclosure.
Figure 8:
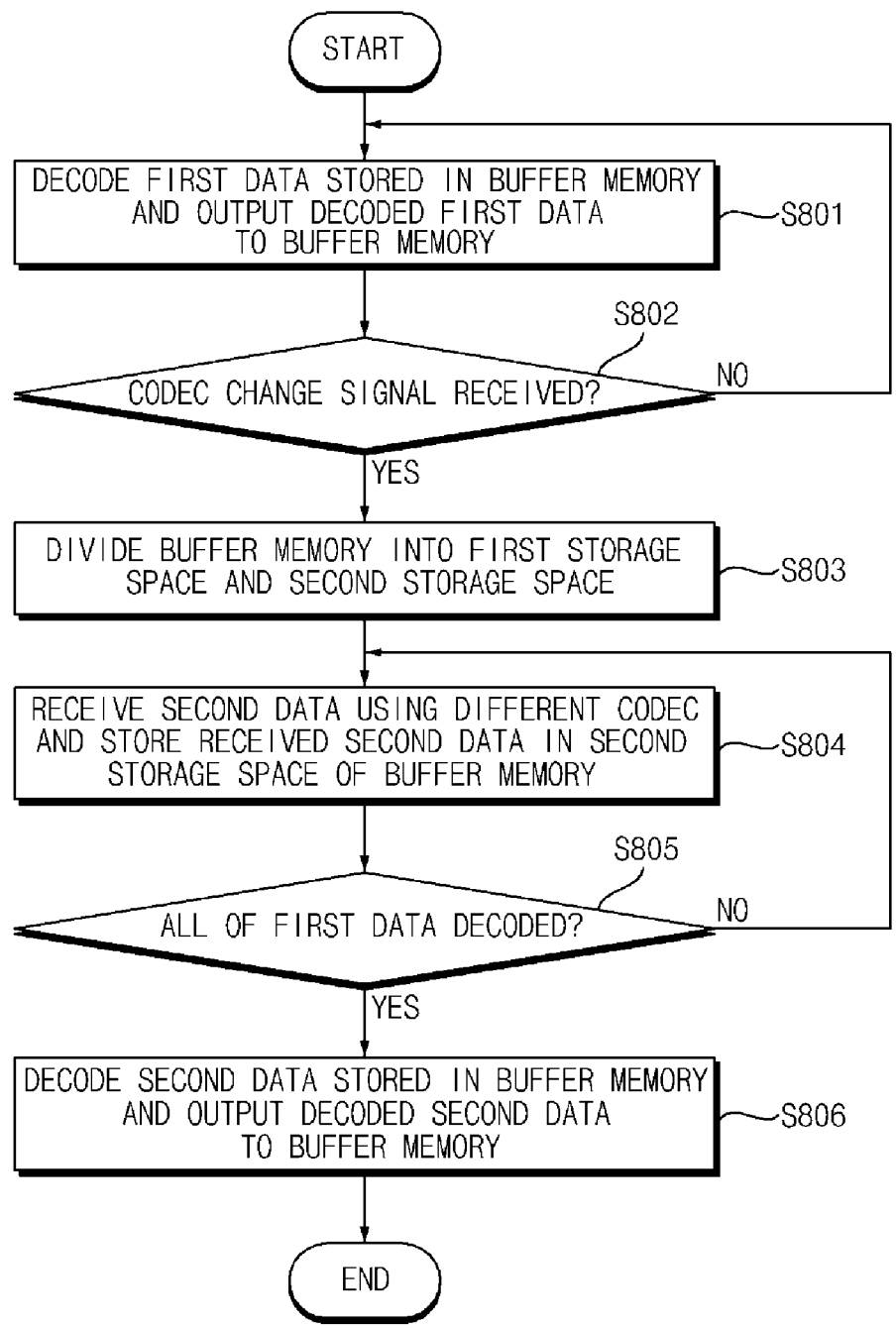
Figure 9:
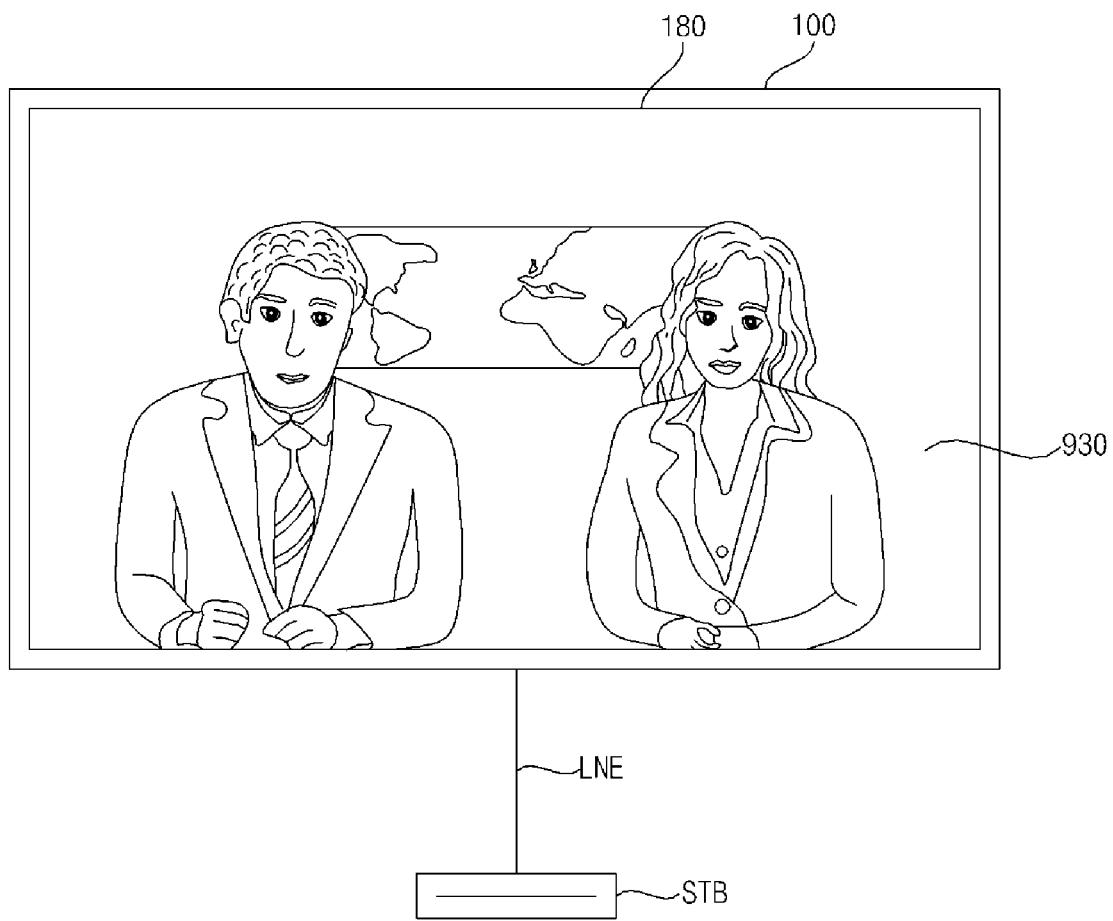

FIG. 6 is an example of an internal block diagram of a signal processing device according to an embodiment of the present disclosure. FIGS. 7 to 9 are diagrams referred to in the description of FIG. 6.

Referring to FIG. 6, the signal processing device 600 according to an embodiment of the present disclosure includes a decoder 630 for decoding data encoded based on at least two different coder-decoders (codecs), a buffer memory 650 for storing encoded data and data decoded by the decoder 630, and a controller 660 for controlling the operations of the decoder 630 and the buffer memory 650, and the controller 660 may control the decoder 630 to divide the buffer memory 650 into a first storage space related to first data and a second storage space related to second data using a codec different from that used for the first data when a codec change signal 601 is received, and may manage input or output of data of the first storage space and the second storage space in parallel or simultaneously.

The signal processing device 600 may perform various types of signal processing on input source data to generate video or audio in a form that a user can view and hear.

The decoder 630 of the signal processing device 600 may decode data encoded based on at least two different coder-decoders (codecs).

An encoder of a source device (not shown) that provides data to the signal processing device 600 may encode a video or audio source. For example, the encoder may perform encoding based on a codec standard such as H.264, MPEG-4, or HEVC.

Source data input to the signal processing device 600 is data obtained by encoding a video or audio source by the source device and transmitted. The input source data may be received broadcast data or various types of streaming content data received through the Internet or the like.

Streaming content data may include MPEG-dynamic adaptive streaming over HTTP (DASH) content data, http live streaming (HLS) content data, or ATSC 3.0-based broadcast content data.

Source data received by the signal processing device 600 may include a header and an extension including information for processing video data or audio data, and a part including encoded video data, audio data, or subtitle data.

The decoder 630 may decode encoded video data or audio data. The decoder 630 may be divided into a video decoder (not shown) for decoding video data and an audio decoder (not shown) for decoding audio data.

The decoder 630 may perform decoding using the same codec standard as a codec standard used when the encoder of the source device encodes data. The decoder 630 may use H.264, MPEG-4, or HEVC as the same standard as that used by the encoder.

The buffer memory 650 may be a buffer memory that stores encoded data and data decoded by the decoder 630. Since the encoded data and the decoded data are data input to and output from the decoder 630, they may be temporarily stored in the buffer memory 650.

The buffer memory 650 may be configured as various memory devices. For example, the buffer memory 650 may be configured as any of a DRAM, an SDRAM, an MRAM, an RRAM, or other types of memory devices.

Meanwhile, the buffer memory 650 may include a first buffer memory 651 for storing encoded data and a second buffer memory 652 for storing data decoded by the decoder 630.

The decoder 630 may decode encoded data stored in the first buffer memory 651 of the buffer memory 650 and output the decoded data to the second buffer memory 652 of the buffer memory 650. The decoded data stored in the buffer memory 650 may then be rendered and output.

The controller 660 may control the decoder 630 and the buffer memory 650. When encoded data is input, the controller 660 may control the decoder 630 to store the input data in the buffer memory 650, decode the stored data, and output the decoded data to the buffer memory 650.

When the controller 660 receives the codec change signal 601, the controller 660 may control the decoder 630 to divide the buffer memory 650 into the first storage space related to first data and the second storage space related to second data using a codec different from that used for the first data.

The first data and the second data may comprise at least one or more pieces of frame data.

The first data may be data currently being decoded by the decoder 630 or encoded data stored in the buffer memory 650 to be decoded by the decoder 630. The second data may be data to be decoded by the decoder 630 in the future and may be data encoded using a codec different from the codec used to encode the first data.

Accordingly, the first storage space may be parts of the first buffer memory 651 and the second buffer memory 652, and the second storage space may also be parts of the first buffer memory 651 and the second buffer memory 652.

The codec change signal 601 is a signal indicating that the second data using a codec different from the codec used to encode the first data has been input.

The signal processing device 600 may further include a demultiplexer 610 that receives data and separates encoded data from the received data.

The demultiplexer 610 analyzes the header of received data, determines the type of a codec used to encode the received data, and if codec information included in the header is different from codec information of data currently being processed by the decoder 630 or the renderer 640, generates and outputs the codec change signal 601.

If the codec information included in the header is the same as the codec information of the data currently being processed by the decoder 630 or the renderer 640, the demultiplexer 610 may not output the codec change signal 601.

The signal processing device 600 may further include a parser 620 that reprocesses data separated by the demultiplexer 610 into a form that can be processed by the decoder 630. The parser 620 may group or separate data into units (NAL, AU, or the like) that can be processed by the decoder 630.

When the demultiplexer 610 generates and outputs the codec change signal 601, the codec change signal 601 may be transmitted to the controller 660 through the parser 620.

The controller 660 may ascertain codec change from the codec change signal 601 and control the decoder 630 to allocate a part of the storage space of the buffer memory 650 in order to store second data.

When the decoder 630 divides the storage space of the buffer memory 650 into the first storage space related to the first data and the second storage space related to the second data, the controller 660 may manage input or output of data of the first storage space and the second storage space in parallel or simultaneously. Accordingly, when a plurality of pieces of content using different coder-decoders (codecs) is received, dynamic codec change may be possible.

Meanwhile, the signal processing device 600 may further include a renderer 640 that renders decoded first data or decoded second data stored in the buffer memory 650 and outputs the rendered data.

The controller 660 may transmit the decoded first data or the decoded second data stored in the buffer memory 650 to the renderer 640 such that the renderer 640 outputs the first data or the second data rendered in response to a refresh rate.

The renderer 640 renders video data decoded by the decoder 530 to generate an image or video that can be displayed on an image display apparatus such as a display, or renders decoded audio data to generate a sound that can be output through a sound source output device such as a speaker. The renderer 640 may be divided into a video renderer (not shown) and an audio renderer (not shown).

Accordingly, the signal processing device 600 may include the demultiplexer 610, the parser 620, the decoder 630, the renderer 640, the buffer memory 650, and the controller 660, and the demultiplexer 610, the parser 620, and the controller 660 may be configured in the form of a pipeline in which the modules thereof are connected.

In the signal processing device 600 according to an embodiment of the present disclosure, the decoder 630, the renderer 640, and the buffer memory 650 may be implemented as physical hardware devices, and the demultiplexer 610, the parser 620, and the controller 660 that form the pipeline are implemented as software, stored in a system memory (not shown), and loaded by a processor such as a central processing unit (CPU) or a graphic processing unit (GPU) to execute functions thereof.

The controller 660 may compare the size of an available storage space of the buffer memory 650 with a preset size, and if the size of the available storage space is equal to or greater than the preset size, control the decoder 630 to allocate the available storage space as the second storage space.

The first data stored in the buffer memory 650 may be sequentially deleted from the first buffer memory 651 as the decoder 630 sequentially performs decoding. The data decoded by the decoder 630 may then be rendered by the renderer 640 and sequentially output from the second buffer memory 652. Accordingly, the size of an available storage space of the first buffer memory 651 and the second buffer memory 652 of the buffer memory 650 may be continuously changed according to the operations of the decoder 630 and the renderer 640.

The controller 660 may control the decoder 630 to allocate the available storage space as the second storage space if the continuously changing size of the available storage space is equal to or greater than the preset size.

Accordingly, the second storage space may be parts of the first buffer memory 651 and the second buffer memory 652.

After the decoder 630 decodes the first data stored in the first buffer memory 651 and sequentially outputs the decoded first data to the second buffer memory 652, the controller 660 may compare the size of the available storage space with the preset size.

In this case, since all of the first data stored in the first buffer memory 651 has been decoded and output, the entire storage space of the first buffer memory 651 may be allotted as the second storage space. If there is an available storage space in the second buffer memory 652, the storage space may be allocated as the second storage space.

Further, even before the decoder 630 decodes the first data stored in the first buffer memory 651 and sequentially outputs the decoded first data to the second buffer memory 652, the controller 660 may compare the size of the available storage space with the preset size.

When the decoder 630 allocates the available storage space as the second storage space, the controller 660 may control the decoder 630 such that the decoder 630 sequentially receives the second data, stores the received second data in the first buffer memory 651, decodes the stored second data, and sequentially outputs the decoded second data to the second buffer memory 652. Accordingly, in a state in which the decoded first data is stored in the second buffer memory 652, the decoder 630 may decode the second data and output the decoded second data to the second buffer memory 652.

Whenever the renderer 640 completes rendering of some frame data among the decoded first data stored in the second buffer memory 652, the controller 660 may control the decoder 630 to additionally allocate a storage space of the second buffer memory 652 in which the rendered some frame data has been stored as the second storage space. Accordingly, the controller 660 may sequentially allocate the second storage space as the decoded first data is rendered.

Further, the controller 660 may control the decoder 630 to vary the sizes of the first buffer memory 651 and the second buffer memory 652 according to the type of a codec used to encode data. A required buffer memory size may depend on the type of a used codec. Accordingly, the controller 660 may control the decoder 630 to vary the sizes of the first buffer memory 651 and the second buffer 652 such that the first buffer memory 651 and the second buffer memory 652 have sizes suitable for a corresponding codec when the codec change signal 601 output by the demultiplexer 610 is received.

Further, the controller 660 may control the decoder 630 to set the sizes of the first buffer memory 651 and the second buffer memory 652 such that the first buffer memory 651 and the second buffer memory 652 have sizes corresponding to a maximum value among the sizes of buffer memories required by different coder-decoders (codecs). In this case, the sizes of the first buffer memory 651 and the second buffer memory 652 may be fixed to the maximum value among the sizes of buffer memories required by different coder-decoders (codecs).

When a user input is received, the controller 660 may control the operations of the decoder 630 and the renderer 640 according to the type of the received input. For example, when a user input such as "pause", "end", "search", or "double-speed playback" is received, the controller 660 may control the operations of the decoder 630 and the renderer 640 according to the type of the received input.

The controller 660 may control the operations of the decoder 630 and the renderer 640 such that the image display apparatus 100 can display an image suitable for input of "pause", "search", or "double-speed playback", and may control the operations of the decoder 630 and the renderer 640 such that the operations temporarily stop or end in response to the input of "pause" or "end".

In the above description, the signal processing device 600 is divided into the demultiplexer 610, the parser 620, the decoder 630, the renderer 640, the buffer memory 650, and the controller 660 for convenience of description. However, this is merely an example, and the signal processing device 600 may be implemented using only some of the above-described components or may be implemented as a combination of some or all of the above-described components and other components.

In addition, although the decoder 630 and the renderer 640 among the above-described components are implemented as physical hardware in the above description, the decoder 630 and the renderer 6430 may be provided as software for executing the above-described functions and stored in a system memory. The software may be loaded by a processor such as a CPU or a GPU and the functions may be executed.

Similarly, although the demultiplexer 610, the parser 620, and the controller 660 among the above-described components are implemented as software in the above description, they may be implemented as physical hardware as necessary. In addition, although the controller 660 only controls the decoder 630 and the renderer 640 in the above description, the controller 660 may perform decoding and rendering according to software as necessary.

FIGS. 7a to 7g are diagrams showing that a continuous operation of the signal processing device according to an embodiment of the present disclosure is divided into steps.

In this example, although it is assumed that the preset size of the buffer memory, used for the controller 660 to allocate the second storage space, is "6", but is not limited thereto.

Figure 7A:
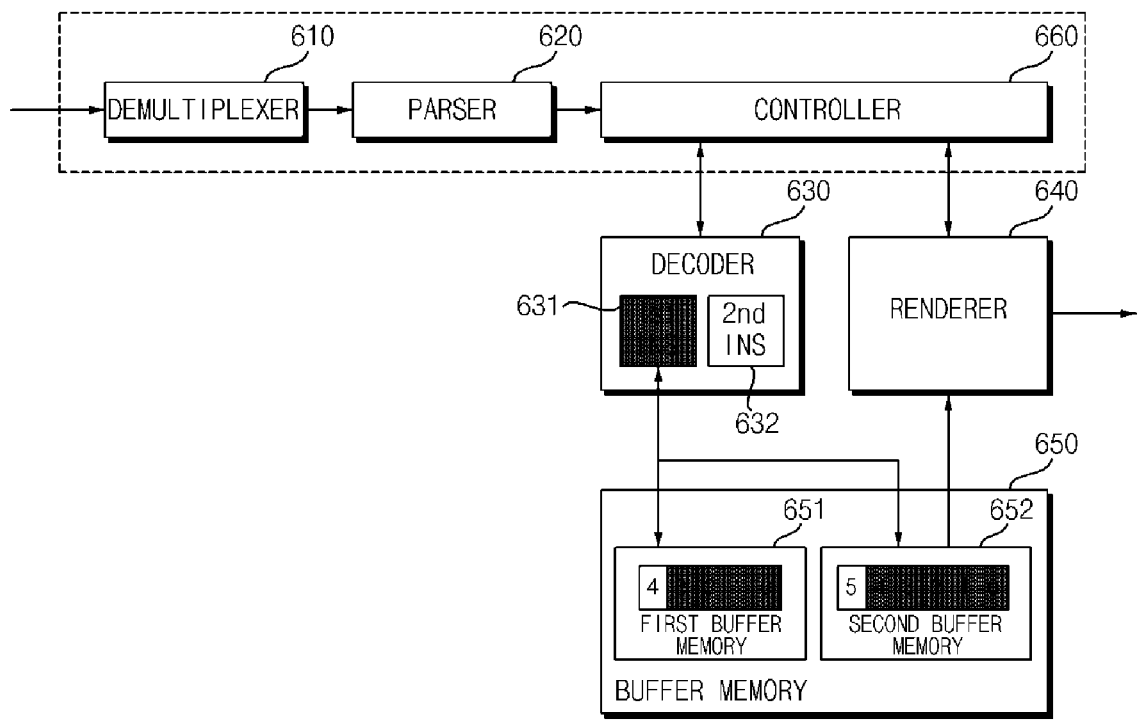
FIGS. 7 to 9 are diagrams referred to in the description of FIG. 6.

Referring to FIG. 7a, the decoder 630 may operate separately in a first instance 631 and a second instance 632 in order to decode data encoded based on at least two different coder-decoders (codecs). The number of instances in the decoder 630 may be set to two or more in some cases.

In order to manage the decoder 630, the controller 660 may respectively manage the first instance 631 and the second instance 632.

Since setting and managing a plurality of instances is a technique such as multi-processing, multi-threading, or process context-switch used in a general CPU, detailed description thereof will be omitted in the present disclosure.

The first buffer memory 651 may be called a coded picture buffer (CPB), and the second buffer memory 652 may be called a decoded picture buffer (DPB), but the present disclosure is not limited thereto.

Referring to the figure, storage spaces of "0" to "4" and "0" to "5" of the first buffer memory 651 and the second buffer memory 652 may be spaces capable of storing frame data. However, the present disclosure is not limited thereto.

In addition, the sizes of the storage spaces of the first buffer memory 651 and the second buffer memory 652 may vary depending on the type of a codec and may be fixed to a maximum value among buffer sizes required by different coder-decoders (codecs).

Referring to the figure, the first instance 631 of the decoder 630 may operate to decode the first data stored in the first buffer memory 631 and output the decoded first data to the second buffer memory 652 in the first step.

In this case, the second instance 632 of the decoder 630 may not operate.

Figure 7B:
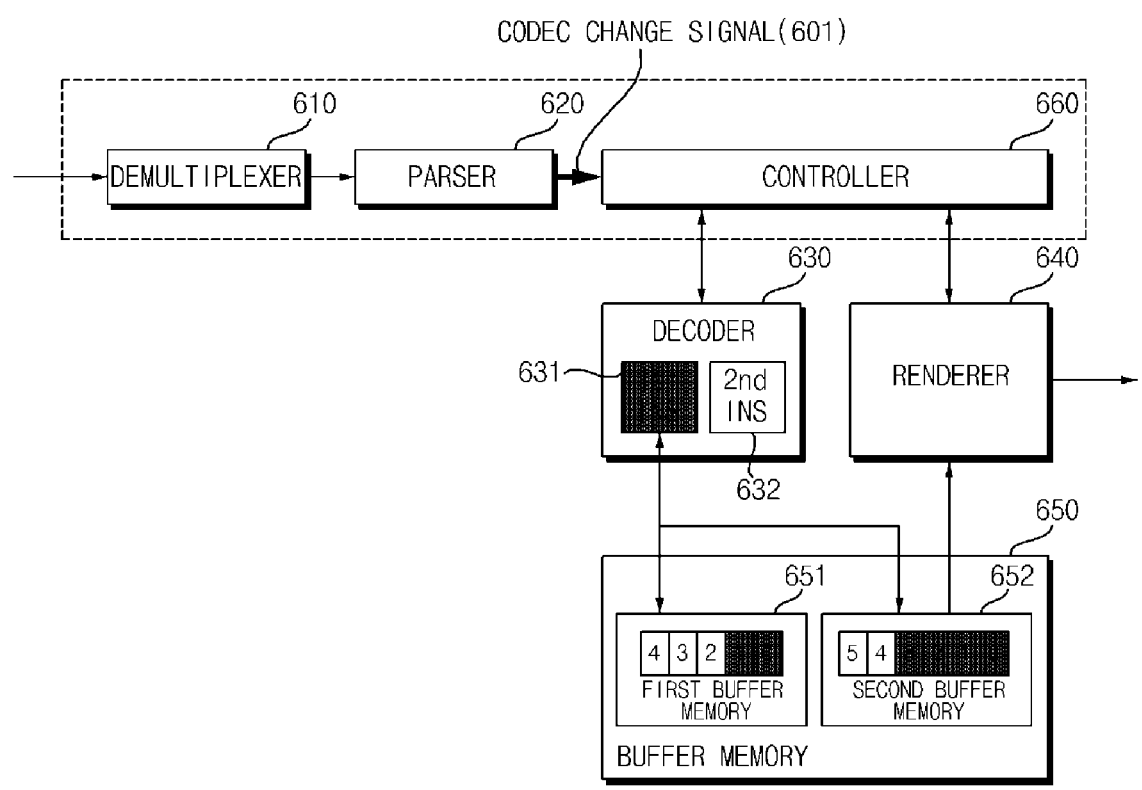

Referring to FIG. 7b, second data encoded using a different type of codec from the codec used to encode the first data may be input in the second step.

The demultiplexer 610 may output the codec change signal 601, and the controller 660 may receive the codec change signal 601 through the parser 620.

Figure 7C:
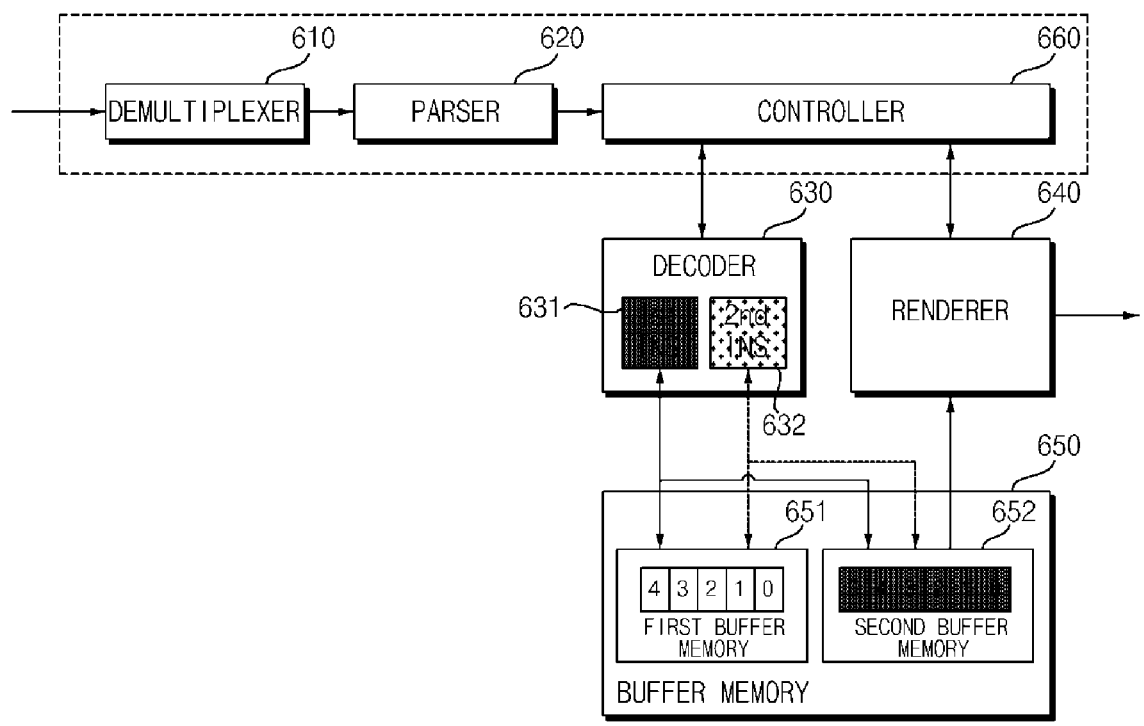

Referring to FIG. 7c, the controller 660 may enable the second instance 632 of the decoder 630 in the third step.

The controller 660 may compare the size of an available storage space with the preset size after the decoder 630 decodes the first data stored in the first buffer memory 651 and sequentially outputs all of the decoded first data to the second buffer memory 652.

On the other hand, the controller 660 may compare the size of the available storage space with the preset size even before the decoder 630 decodes the first data stored in the first buffer memory 651 and sequentially outputs all of the decoded first data to the second buffer memory 652.

Figure 7D:
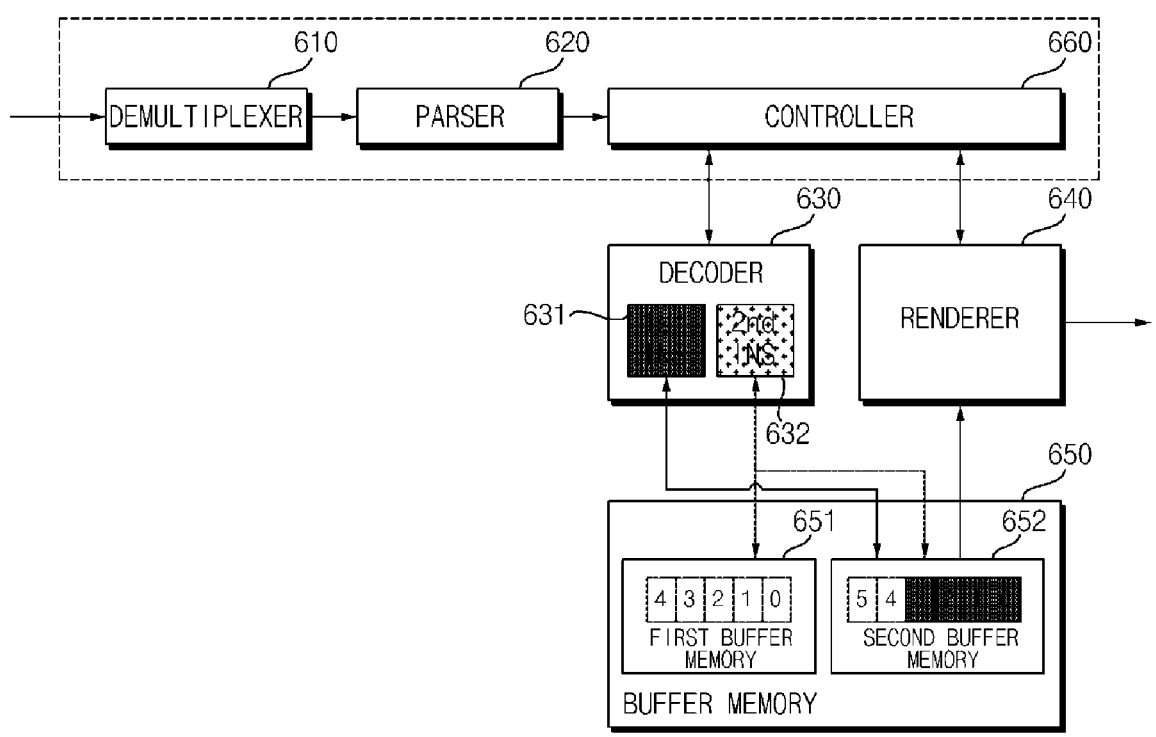

Referring to FIG. 7d, the controller 660 may determine that the size of available storage spaces among the storage spaces of the first buffer memory 651 and the second buffer memory 652 is greater than the preset size "6" because the size of an available storage space is "7" in the fourth step.

Accordingly, the controller 660 may allocate available spaces of "0" to "4" in the first buffer memory 651 and available spaces of "4" and "5" in the second buffer memory 652 as a second storage space related to the second data.

The controller 660 may control the second instance 632 of the decoder 630 to be enabled. The allocated second storage space may be managed by the operation of the second instance 632 of the decoder 630.

Figure 7E:
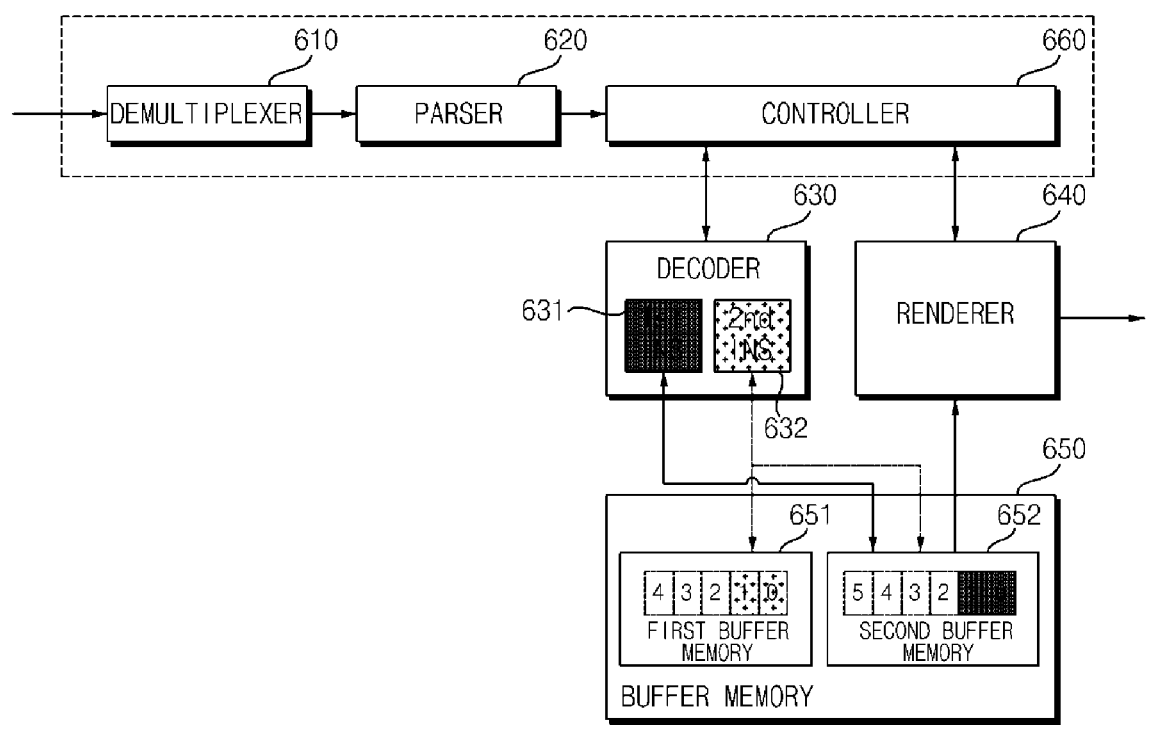

Referring to FIG. 7e, the controller 660 may control the second instance 632 of the decoder 630 to store the second data in the first buffer memory 651 in the fifth step.

The second data may be sequentially stored in the second storage space in the first buffer memory 651.

In the fifth step, both the first instance 631 and the second instance 632 of the decoder 630 may operate. The first instance 631 of the decoder 630 may transmit the decoded first data stored in the second buffer memory 652 to the renderer 640 such that the renderer 640 outputs the first data rendered in accordance with the refresh rate.

In addition, the controller 660 may control the second instance 632 of the decoder 630 such that the second instance 632 sequentially receives the second data, stores the received second data in the first buffer memory 651, decodes the stored second data, and sequentially outputs the decoded second data to the second buffer memory 652. Accordingly, in a state in which some frame data of the decoded first data is stored in the second buffer memory 652, the decoder 630 may decode the second data and output the decoded second data to the second buffer memory 652.

In addition, whenever the renderer 640 completes rendering of some frame data of the decoded first data stored in the second buffer memory 652, the controller 660 may control the decoder 630 such that the second instance 632 of the decoder 630 additionally allocates the storage space of the second buffer memory 652 in which the rendered frame data has been stored as the second storage space. Accordingly, the controller 660 can sequentially allocate the second storage spaces as the decoded first data is rendered.

Figure 7F:
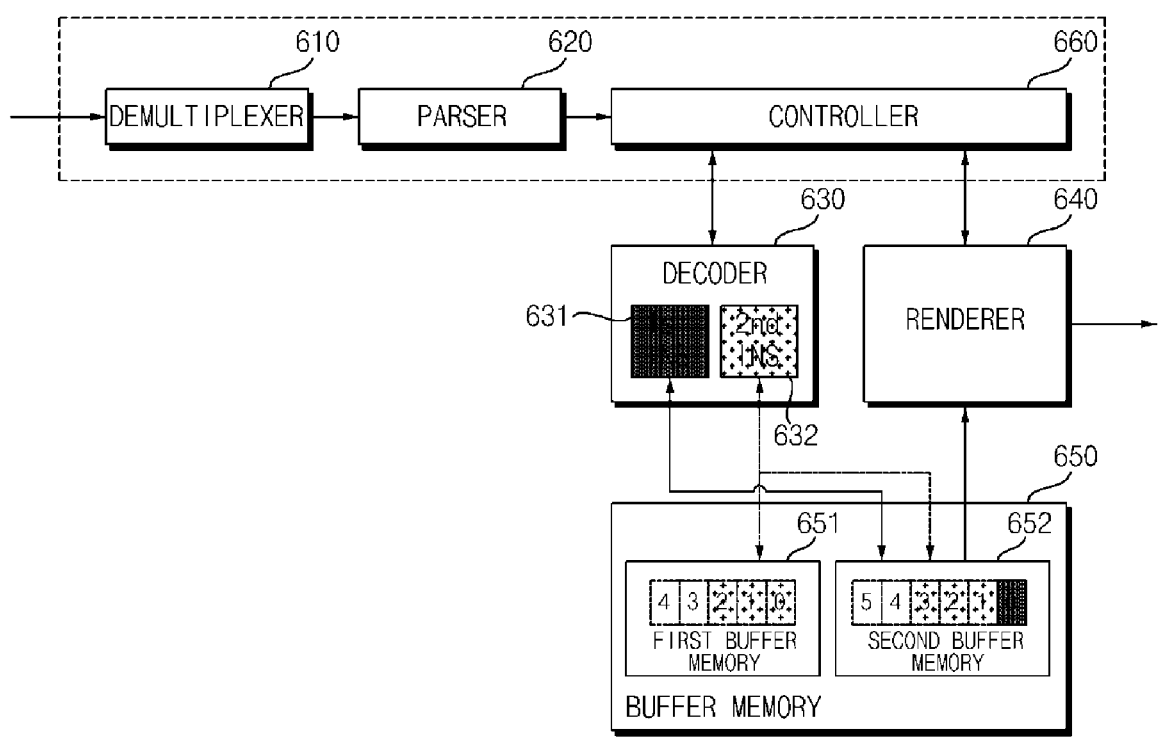

Referring to FIG. 7f, the second instance 632 of the decoder 630 sequentially outputs the decoded second data to the second buffer memory 652 in the sixth step. The decoding rate of the decoder 630 may be higher than the rendering rate of the renderer 640.

Accordingly, in a state in which some frame data of the decoded first data is stored in the second buffer memory 652, the decoded second data may be sequentially stored in the second buffer memory 652. Accordingly, the controller 660 may control the decoder 630 such that the first instance 631 and the second instance 632 seamlessly transmit frame data of the decoded first data and frame data of the decoded second data to the renderer 640.

Figure 7G:
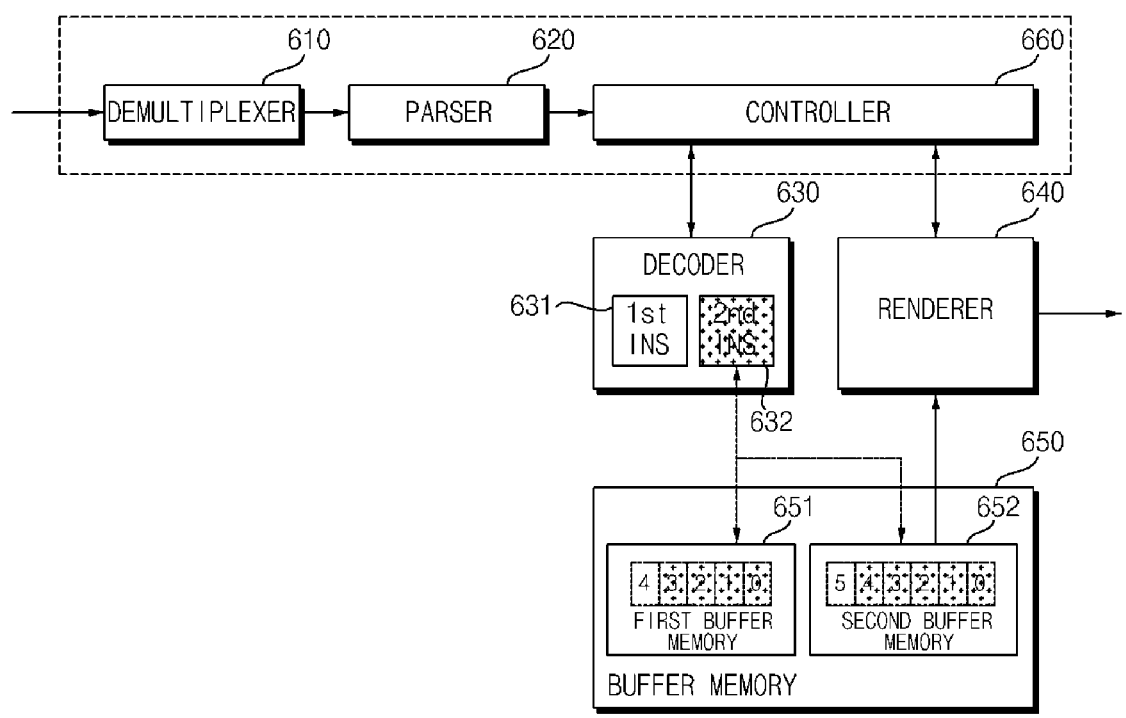

Referring to FIG. 7g, after all of the decoded second data stored in the second buffer memory 652 is output to the renderer 640, the controller 660 may disable the first instance 631 of the decoder 630 in the seventh step.

The second instance 632 of the decoder 630 may allocate the entire spaces of the first buffer memory 651 and the second buffer memory 652 as the second storage space.

Accordingly, as in the first step shown in FIG. 7a, the signal processing device 600 may operate to stably output an image even after the codec is changed.

FIG. 8 is a flowchart showing a method of operating the signal processing device according to an embodiment of the present disclosure.

Referring to the figure, the decoder 630 of the signal processing device 600 may decode the first data stored in the buffer memory 650 and output the decoded first data to the buffer memory 650. Specifically, the decoder 630 may decode the first data stored in the first buffer memory 651 and output the decoded first data to the second buffer memory 652 (S801).

The controller 660 determines whether the codec change signal 601 is received (S802).

If the codec change signal is not received, the controller 660 may control the decoder 630 to decode the first data stored in the buffer memory 650 and output the decoded first data to the buffer memory 650.

If the codec change signal is received, the controller 660 may control the decoder 630 to divide the buffer memory 650 into a first storage space and a second storage space (S803).

The controller 660 may control the decoder 630 to receive the second data encoded using a codec different from a codec used to encode the first data and store the received second data in the second storage space of the buffer memory 650. Specifically, the controller 660 may control the decoder 630 to store the second data in the second storage space allocated to the first buffer memory 651 (S804).

Thereafter, the controller 660 determines whether the decoder 630 has decoded all of the first data stored in the buffer memory 650 (S805).

If the decoder 630 has not decoded all of the first data, the controller 660 may control the decoder 630 to continuously receive the second data and store the second data in the second storage space of the buffer memory 650. In this case, the decoder 630 continuously performs decoding of the first data.

If the decoder 630 has decoded all of the first data, the controller 660 controls the decoder 630 to decode the second data stored in the buffer memory 650 and output the decoded second data to the buffer memory 650. Specifically, the decoder 630 may decode the second data stored in the first buffer memory 651 and output the decoded second data to the second buffer memory 652 (S806).

Accordingly, even when a plurality of pieces of contents using different coder-decoders (codecs) is received, the image display apparatus 100 can minimize codec switching delay through dynamic codec change and display a normal image 930 on the display 180, as shown in FIG. 9, and a user can enjoy a stable screen without flickering.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

What is claimed is:

1. A signal processing device comprising:
   a decoder configured to decode data encoded based on at least two different coder-decoders (codecs);
   a buffer memory configured to store the encoded data and the data decoded by the decoder; and
   a controller configured to control the decoder and the buffer memory,
   wherein the controller controls the decoder to divide the buffer memory into a first storage space related to first data and a second storage space related to second data using a codec different from a codec used for the first data based on a codec change signal being received, and manages input or output of data of the first storage space and the second storage space in parallel or simultaneously, wherein the controller compares a size of an available storage space of the buffer memory with a preset size, and based on the size of the available storage space being equal to or greater than the preset size, controls the decoder to allocate the available storage space as the second storage space.

2. The signal processing device of claim 1, wherein the controller compares the size of the available storage space with the preset size after the decoder decodes the first data stored in the buffer memory and sequentially outputs all of the decoded first data to the buffer memory.

3. The signal processing device of claim 1, wherein, in case in which the decoder allocates the available storage space as the second storage space, the controller controls the decoder to sequentially receive the second data, store the received second data in the buffer memory, decode the stored second data, and sequentially output the second data to the buffer memory.

4. The signal processing device of claim 1, further comprising a renderer configured to render decoded first data or decoded second data stored in the buffer memory and to output the rendered data.

5. The signal processing device of claim 4, wherein the controller transmits the decoded second data stored in the buffer memory to the renderer to output data rendered in response to a refresh rate.

6. The signal processing device of claim 4, wherein the first data and the second data comprise at least one piece of frame data, and whenever the renderer completes rendering of some frame data of the decoded first data, the controller controls the decoder to additionally allocate a storage space of the buffer memory in which the frame data has been stored as the second storage space.

7. The signal processing device of claim 1, wherein the buffer memory includes a first buffer memory for storing the encoded data and a second buffer memory for storing the decoded data, and
wherein the controller controls the decoder to change sizes of the first buffer memory and the second buffer memory based on a type of a codec used for encoding of the encoded data.

8. The signal processing device of claim 1, wherein the buffer memory includes a first buffer memory for storing the encoded data and a second buffer memory for storing the decoded data, and
wherein the controller controls the decoder to set sizes of the first buffer memory and the second buffer memory to a maximum value among buffer sizes required by different coder-decoders (codecs).

9. The signal processing device of claim 1, further comprising a demultiplexer configured to receive data and to separate the encoded data from the received data,
wherein the encoded data includes at least one of encoded video data, encoded audio data, or encoded subtitle data.

10. A signal processing device comprising:
a demultiplexer configured to receive data and to separate encoded data from the received data,
a decoder configured to decode the encoded data based on at least two different coder-decoders (codecs);
a buffer memory configured to store the encoded data and data decoded by the decoder;
a controller configured to control the decoder and the buffer memory; and
a renderer configured to render decoded first data or decoded second data stored in the buffer memory and to output the rendered data,
wherein the controller controls the decoder to divide the buffer memory into a first storage space related to first data and a second storage space related to second data using a codec different from a codec used for the first data based on a codec change signal being received, and manages input or output of data of the first storage space and the second storage space in parallel or simultaneously,
wherein the encoded data includes at least one of encoded video data, encoded audio data, or encoded subtitle data,
wherein the demultiplexer analyzes a header of the received data, determines a type of a codec used for encoding of the encoded data, and generates and outputs the codec change signal.

11. The signal processing device of claim 1, further comprising a renderer configured to render decoded first data or decoded second data stored in the buffer memory and to output the rendered data,
wherein a decoding rate of the decoder is higher than a rendering rate of the renderer.

12. An image display apparatus comprising:
a display; and
a signal processing device,
wherein the signal processing device comprising:
a decoder configured to decode data encoded based on at least two different coder-decoders (codecs);
a buffer memory configured to store the encoded data and the data decoded by the decoder;
a controller configured to control the decoder and the buffer memory; and
a renderer configured to render decoded first data or decoded second data stored in the buffer memory and to output the rendered data,
wherein the controller controls the decoder to divide the buffer memory into a first storage space related to first data and a second storage space related to second data using a codec different from a codec used for the first data based on a codec change signal being received, and manages input or output of data of the first storage space and the second storage space in parallel or simultaneously,
wherein the first data and the second data comprise at least one piece of frame data, and whenever the renderer completes rendering of some frame data of the decoded first data, the controller controls the decoder to additionally allocate a storage space of the buffer memory in which the frame data has been stored as the second storage space.

13. The image display apparatus of claim 12, wherein the controller compares a size of an available storage space of the buffer memory with a preset size, and based on the size of the available storage space being equal to or greater than the preset size, controls the decoder to allocate the available storage space as the second storage space.

14. The image display apparatus of claim 13, wherein the controller compares the size of the available storage space with the preset size after the decoder decodes the first data stored in the buffer memory and sequentially outputs all of the decoded first data to the buffer memory.

15. The image display apparatus of claim 12, wherein, in case in which the decoder allocates the available storage space as the second storage space, the controller controls the decoder to sequentially receive the second data, store the received second data in the buffer memory, decode the stored second data, and sequentially output the second data to the buffer memory.

16. The image display apparatus of claim 12, wherein the controller transmits the decoded second data stored in the buffer memory to the renderer to output data rendered in response to a refresh rate.

17. The image display apparatus of claim 12, wherein the buffer memory includes a first buffer memory for storing the encoded data and a second buffer memory for storing the decoded data, and wherein the controller controls the decoder to change sizes of the first buffer memory and the second buffer memory based on a type of a codec used for encoding of the encoded data.

\* \* \* \* \*